(12) United States Patent
Deng et al.

(10) Patent No.: US 11,687,699 B2
(45) Date of Patent: Jun. 27, 2023

(54) METHOD FOR MODELING SEQUENCE IMPEDANCE OF MODULAR MULTILEVEL CONVERTER UNDER PHASE LOCKED LOOP COUPLING

(71) Applicant: SOUTHEAST UNIVERSITY, Nanjing (CN)

(72) Inventors: Fujin Deng, Nanjing (CN); Yun Zhou, Nanjing (CN); Hanlu Zhang, Nanjing (CN); Chengkai Liu, Nanjing (CN); Jianzhong Zhang, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/771,967

(22) PCT Filed: Dec. 11, 2021

(86) PCT No.: PCT/CN2021/137273
§ 371 (c)(1),
(2) Date: Apr. 26, 2022

(87) PCT Pub. No.: WO2022/160972
PCT Pub. Date: Aug. 4, 2022

(65) Prior Publication Data
US 2023/0118255 A1    Apr. 20, 2023

(30) Foreign Application Priority Data
Jan. 28, 2021 (CN) .......................... 202110115609.3

(51) Int. Cl.
*G06F 30/00* (2020.01)
*G06F 30/398* (2020.01)
*H02J 3/38* (2006.01)

(52) U.S. Cl.
CPC ............ *G06F 30/398* (2020.01); *H02J 3/381* (2013.01); *H02J 2203/20* (2020.01)

(58) Field of Classification Search
CPC ...... G06F 30/398; H02J 3/381; H02J 2203/20
See application file for complete search history.

(56) References Cited

FOREIGN PATENT DOCUMENTS

| CN | 106936125 A | 7/2017 |
|---|---|---|
| CN | 108880300 A | 11/2018 |

(Continued)

*Primary Examiner* — Naum Levin
(74) *Attorney, Agent, or Firm* — Muncy, Geissler, Olds & Lowe, P.C.

(57) ABSTRACT

The present invention discloses a method for modeling sequence impedance of a modular multilevel converter (MMC) under phase locked loop (PLL) coupling. The method includes the following steps: S1, establishing a circuit topology model; S2, establishing a PLL output characteristic model; S3, establishing a PI controller output control small signal model under a dq axis; S4, deducing a modulation small signal; and S5, calculating MMC port impedance. According to the method, a precise MMC port impedance model is established by analyzing a double mirror frequency coupling effect in the output of a modulation signal in a control link caused by a phase angle disturbance and comprehensively considering the combination of the multi-harmonic coupling effect of an MMC. On one hand, the proposed modeling method aims at a common MMC adopting current closed-loop control, in which a half-bridge sub-module is adopted, a circuit topological structure and a control structure are both more common, and a mathematical model is easy to establish. On the other hand, the physical significance of an impedance analysis method is clear, the modeling process is modular and is easy to understand and implement, and the inverter port impedance can be measured on site, so that the correctness of theoretical modeling can be conveniently verified.

6 Claims, 10 Drawing Sheets

(56) References Cited

FOREIGN PATENT DOCUMENTS

| | | | |
|---|---|---|---|
| CN | 108923463 | A | 11/2018 |
| CN | 111525561 | A | 8/2020 |
| CN | 111541262 | A | 8/2020 |
| CN | 111628517 | A | 9/2020 |
| CN | 112039065 | A | 12/2020 |
| CN | 110598253 | B * | 6/2021 |
| CN | 112953172 | A | 6/2021 |
| EP | 2811641 | A1 | 12/2014 |
| WO | WO-2017041428 | A1 | 3/2017 |

* cited by examiner

METHOD FOR MODELING SEQUENCE IMPEDANCE OF MODULAR MULTILEVEL CONVERTER UNDER PHASE LOCKED LOOP COUPLING

TECHNICAL FIELD

The present invention belongs to the technical field of multilevel power electronic converters, and particularly relates to a method for modeling sequence impedance of a modular multilevel converter (MMC) under phase locked loop (PLL) coupling.

BACKGROUND

With the continuous development of technology, an MMC has the advantages of high output level, low output harmonic, low switching loss, easy modular extension, etc. Therefore, the MMC is more and more widely used in the field of flexible direct current transmission. Different from traditional generators with high damping and large inertia characteristics, if grid-connected inverters with weak damping and low inertia characteristics are used, the equivalent impedance of power grid lines can no longer be ignored. If the equivalent impedance of a converter side does not match the impedance of power grid lines, a resonance phenomenon will occur in a grid-connected cascade system, which will affect the stable and reliable operation thereof.

An MMC-based grid-connected system usually adopts a current closed-loop control strategy, mainly including alternating current side current control, circulating current suppression, PLL, and other control links. However, there are few references to design controller parameters of the MMC from the perspective of system stability, which leads to a blind trial of the controller parameters when applying these control strategies. However, the setting of the controller parameters directly affects the port impedance characteristics of a converter, and also affects the operation stability of the cascade system. Therefore, it is necessary to research an impedance modeling method suitable for an MMC so as to guide the parameter design of an MMC controller.

A mathematical model of the MMC is a time-varying, nonlinear, multi-frequency, and multi-input and multi-output complex system. The traditional small signal modeling method based on a classical control theory cannot be directly applied to the MMC. A state space method based on a modern control theory can effectively model multiple state variables and a coupling relationship between state variables. In recent years, researchers have combined the state space theory with a multi-harmonic linearized theory to form a harmonic state space theory, which has been able to establish a high-precision model for the MMC. However, an MMC grid-connected system based on current closed-loop control is a multi-dimensional coupling model. In addition to the multi-harmonic coupling of the MMC, a double mirror frequency coupling phenomenon exists in a PLL control system. This complex cross-coupling characteristic further improves the complexity of modeling. The existing researches have two deficiencies: on the one hand, a PLL theoretical model for a frequency domain is not well established; on the other hand, the influence of the double frequency mirror coupling characteristic of the PLL on the port impedance characteristic of the MMC needs to be analyzed. Therefore, the impedance modeling method proposed herein has important significance.

SUMMARY

In view of the deficiencies of the prior art, an object of the present invention is to provide a method for modeling sequence impedance of an MMC under PLL coupling. By establishing a relationship model between a frequency-domain PLL phase angle small signal and a q-axis voltage small signal of a power grid, a double mirror frequency coupling effect in the output of a modulation signal in a control link caused by a phase angle disturbance is analyzed. A system model is substituted into a harmonic state space matrix, and a current response in consideration of the interactive coupling of a control system and a converter is calculated. The method comprehensively considers mirror frequency coupling of the control system and multi-harmonic coupling of the MMC, and establishes a precise MMC port impedance model.

The objective of the present invention may be achieved by the following technical solution.

A method for modeling sequence impedance of an MMC under PLL coupling includes the following steps:

S1, establishing a circuit topology model dividing a current-controlled MMC grid-connected system into two parts: a circuit topology and a control link, and acquiring relevant parameters;

S2, establishing a PLL output characteristic model establishing a relationship model between a PLL output phase angle small signal $\Delta\theta$ and a q-axis power grid voltage small signal of a power grid and a PLL controller $G_{pll}$ according to an abc/dq transformation formula under a phase angle disturbance and a PLL control signal path;

S3, establishing a PI controller output control small signal model under a dq axis establishing a relationship model between control small signals $\Delta e_d$ and $\Delta e_q$ under the dq axis and current small signals $\Delta i_d$ and $\Delta i_q$ under the dq axis, current steady-state operating points $i_d$ and $i_q$ under the dq axis, and the phase angle small signal $\Delta\theta$ and a current controller $G_i$ according to a current closed-loop control path;

S4, deducing a modulation small signal obtaining modulation small signals of frequency $f_p$ output by a phase-a control system and frequency $f_p \mp 2f1$ generated under the action of PLL coupling according to the control small signals $\Delta e_d$ and $\Delta e_q$ and in consideration of a dq/abc transformation formula under a phase angle disturbance;

S5, calculating MMC port impedance substituting a system model into a harmonic state space matrix, calculating a current response $\Delta i_g$ when injecting a voltage disturbance $\Delta u_g$, and finally calculating MMC port impedance according to a port impedance definition.

Further, the establishing a circuit topology model in S1 is as follows:

$$\begin{cases} Ri_g + L\dfrac{di_g}{dt} + 2u_g = n_l u_{cl}^\Sigma - n_u u_{cu}^\Sigma \\ 2Ri_c + 2L\dfrac{di_c}{dt} + n_l u_{cl}^\Sigma + n_u u_{cu}^\Sigma = U_{dc} \\ C_{arm}\dfrac{du_{cu}^\Sigma}{dt} = n_u\left(i_c + \dfrac{i_g}{2}\right) \\ C_{arm}\dfrac{du_{cl}^\Sigma}{dt} = n_l\left(i_c - \dfrac{i_g}{2}\right) \end{cases} \quad (1)$$

In formula (1), R is parasitic resistance of an MMC bridge arm, L is filtering inductance of the MMC bridge arm, $C_{arm}$ is equivalent capacitance of a bridge arm, $u_{cu}^\Sigma$ is a sum of capacitance voltages of an upper bridge arm, $u_{cl}^\Sigma$ is a sum of capacitance voltages of a lower bridge arm, $n_u$ is a modulation signal of the upper bridge arm, $n_l$ is a modulation signal of the lower bridge arm, $i_c$ is the circulating current, $i_g$ is the ac-side current, $U_{dc}$ is a direct current voltage, and $u_g$ is an alternating current power grid voltage.

Further, a relationship model of a PLL output phase angle small signal $\Delta\theta$ in S2 is as follows:

$$\Delta\theta = \frac{G_{PLL}(s \mp j\omega_1)}{s \mp j\omega_1 + u_d G_{PLL}(s \mp j\omega_1)} \Delta u_{qp/n0} = H_{PLL}(s \mp j\omega_1) \Delta u_{qp/n0} \quad (2)$$

In formula (2), $s \mp j\omega$ is a controller frequency offset when injecting positive and negative sequence disturbances, a subscript p/n represents a variable when injecting the positive and negative sequence disturbances, $u_d$ is a d-axis steady-state operating point of a power grid voltage, $\omega_l$ is an angular frequency corresponding to a 50 Hz fundamental frequency of the power grid, and $\Delta u_{qp/n0}$ is a q-axis component obtained by performing Park transformation on a positive or negative sequence small disturbance voltage injected into the MMC alternating current side separately without considering the phase angle disturbance of the PLL;

$$\Delta U_{qp/n0} = \Delta U_g \cos(\omega_p \mp \omega_l) \quad (3)$$

$\Delta U_g$ is an injected disturbance voltage amplitude, $\omega_p$ is an injected disturbance angular frequency, and a PLL transfer function is defined as $H_{PLL}$.

Further, a relationship model of a system output control small signal under a dq axis in S3 is as follows:

$$\begin{cases} \Delta i_{dp/n} = \Delta i_{dp/n0} + i_q \Delta\theta \\ \Delta i_{qp/n} = \Delta i_{qp/n0} + i_d \Delta\theta \end{cases} \quad (4)$$

$$\begin{cases} \Delta e_{dp/n} = \Delta i_{dp/n} G_i(s \mp j\omega_1) \\ \Delta e_{qp/n} = -\Delta i_{qp/n} G_i(s \mp j\omega_1) \end{cases} \quad (5)$$

Further, a phase-a control system output modulation small signal in S4 is calculated as follows:

$$\Delta e_{refp/n} = [\Delta e_{dp/n} \cos(\theta+\Delta\theta) - \Delta 3_{qp/n} \sin(\theta+\Delta\theta)] 2/U_{dc} \quad (6)$$

In formula (6), $\Delta e_{refp/n}$ is a modulation wave small signal disturbance output by phase current closed-loop control after the positive or negative sequence small disturbance voltage is injected into the MMC alternating current side separately, $\theta$ is a power grid voltage phase, it is now defined that $\theta=\omega t$ and a power grid angular frequency $\omega=100\pi$rad/s, and modulation small signals of frequencies $f_p$ and $f_p \mp 2f_l$ contained in an output phase-a of a control system are obtained by substituting specific expressions of each variable into the above formula:

$$\Delta e_{refp/n} = \quad (7)$$
$$\left\{ -\frac{1}{2}[u_q + i_q G_i(s \mp j\omega_1)]\left[\cos\left(\omega_p t - \frac{\pi}{2}\right) + \cos\left((\omega_p \mp 2\omega_1)t - \frac{\pi}{2}\right)\right] - \right.$$
$$\left. \frac{1}{2}[u_d + i_d G_i(s \mp j\omega_1)][\cos(\omega_p \mp 2\omega_1)t - \cos\omega_p t] \right\}$$
$$2H_{PLL}(s \mp j\omega_1)\Delta U_g / U_{dc}$$

Further, the impedance calculation formula in S5 is as follows:

$$Z_{MMC}(\omega_p) = -\frac{\Delta U_g(\omega_p)}{\Delta I_g(\omega_p)} \quad (8)$$

In formula (8), $\Delta U_g(\omega_p)$ is a complex vector form of a grid-connected voltage disturbance at $\omega_p$, and $\Delta I_g(\omega_p)$ is a complex vector form of a grid-connected current disturbance at $\omega_p$.

Beneficial Effects:

1. The method for modeling sequence impedance of an MMC under PLL coupling proposed by the present invention is simple, clear, convenient to calculate, and easy to understand and implement. Aiming at the problem of interactive coupling between a control system and a circuit topology existing in an MMC grid-connected system based on current closed-loop control, a precise MMC port impedance model is established by analyzing a double mirror frequency coupling effect in the output of a modulation signal in a control link caused by a phase angle disturbance and comprehensively considering the combination of the multi-harmonic coupling effect of an MMC. On one hand, the proposed modeling method aims at a common MMC adopting current closed-loop control, in which a half-bridge sub-module is adopted, a circuit topological structure and a control structure are both more common, and a mathematical model is easy to establish. On the other hand, the physical significance of an impedance analysis method is clear, the modeling process is modular and is easy to understand and implement, and the inverter port impedance can be measured on site, so that the correctness of theoretical modeling can be conveniently verified.

2. The method for modeling sequence impedance of an MMC under PLL coupling proposed by the present invention is high in precision of establishment of an MMC impedance model and has a high practical value. The MMC usually adopts a cascade structure, a capacitor is used as an energy storage element in a bridge arm, and in steady state operation, in addition to direct current and fundamental frequency components, harmonic components with double or more frequencies are generated by coupling. In addition, while the capacitance is introduced, state variables of a system are also increased theoretically, and a complex system with time-varying, nonlinear, multi-frequency, and multi-input and multi-output characteristics can be analyzed accurately and effectively by using a harmonic state space theory.

3. The method for modeling sequence impedance of an MMC under PLL coupling proposed by the present invention reveals establishment of a relationship model between a PLL output phase angle small signal and a q-axis voltage small signal of a power grid, and reveals a relationship model between a dq-axis output control small signal and a dq-axis current small signal, a dq-axis current steady-state operating point, a phase angle small signal and a current controller.

4. The method for modeling sequence impedance of an MMC under PLL coupling proposed by the present invention reveals specific expressions of modulation small signals of two frequencies $f_p$ and $f_p \mp 2f_l$ contained in an output phase-a of a control system.

BRIEF DESCRIPTION OF THE DRAWINGS

To describe the technical solutions in embodiments of the present invention or in the related art more clearly, the following briefly describes accompanying drawings required for describing the embodiments or the related art. Apparently, a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some rather than all of the embodiments of the present invention. Based on the embodiments of the invention, all other embodiments obtained by those of ordinary skill in the art without going through any creative work shall fall within the scope of protection of the present invention.

Embodiment 1

Figure 1:
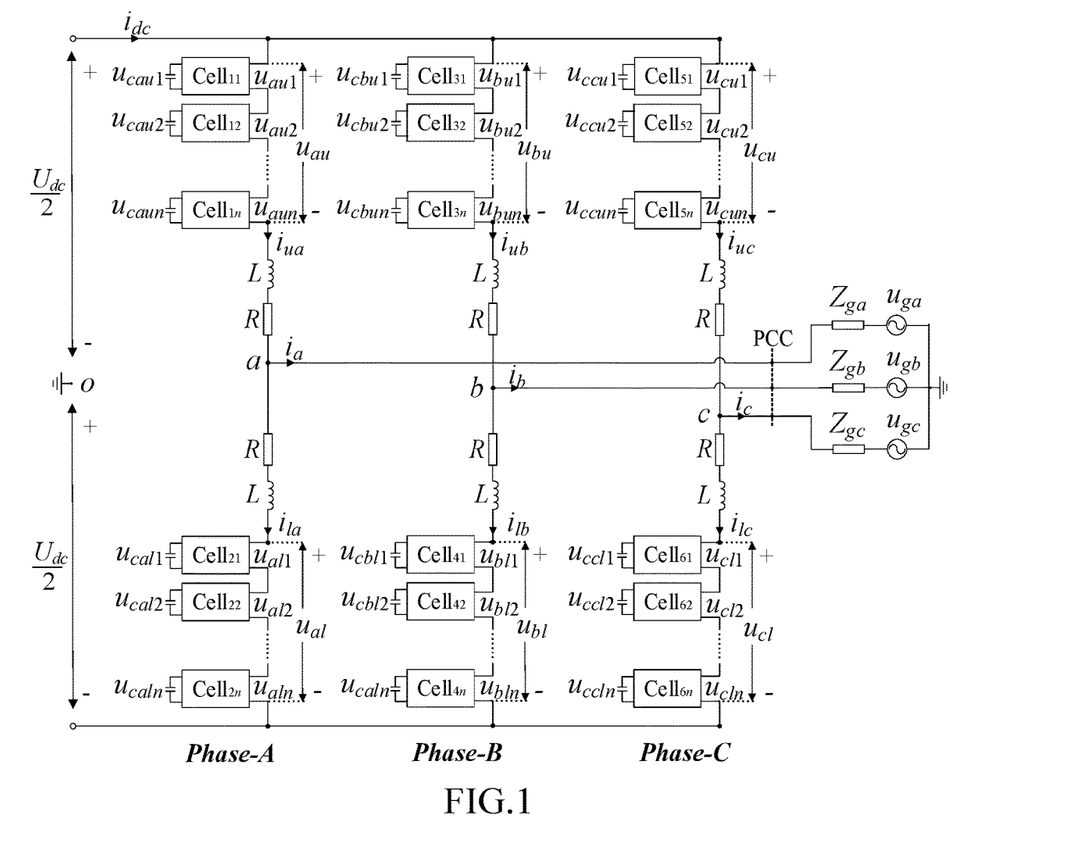
FIG. 1 is a block diagram of a three-phase MMC grid-connected system according to an embodiment of the present invention.
Figure 2:
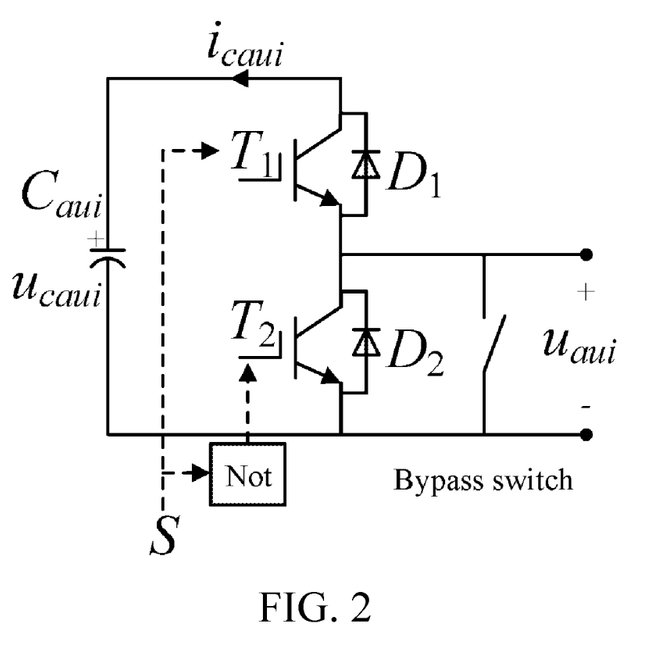
FIG. 2 is a block diagram of sub-module units according to an embodiment of the present invention.
Figure 3:
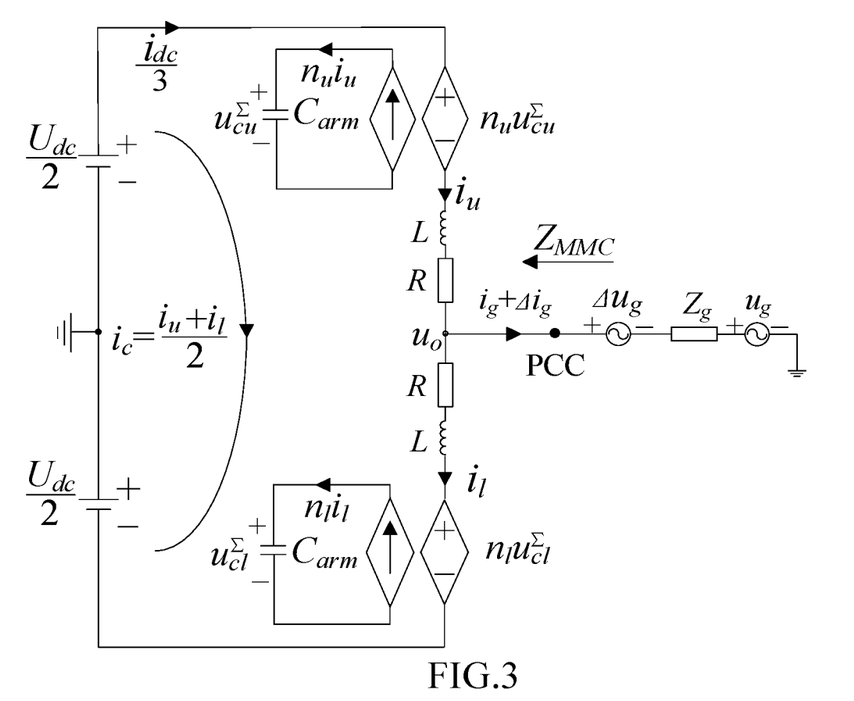
FIG. 3 is an MMC single-phase equivalent circuit according to an embodiment of the present invention.

The present invention is directed to an MMC grid-connected system with current closed-loop control, and proposes a method for modeling impedance of an MMC in consideration of PLL coupling. As shown in FIGS. 1, 2 and 3, the topology of an MMC in the present invention adopts a three-phase six-bridge arm structure. Each bridge arm is formed by cascading n sub-modules of a half-bridge structure and a bridge arm inductor L. Each sub-module is composed of two power switch tubes $T_1$ and $T_2$, two diodes $D_1$ and $D_2$, and an electrolytic capacitor. FIG. 3 is an MMC single-phase equivalent circuit based on an averaging model.

Figure 4:
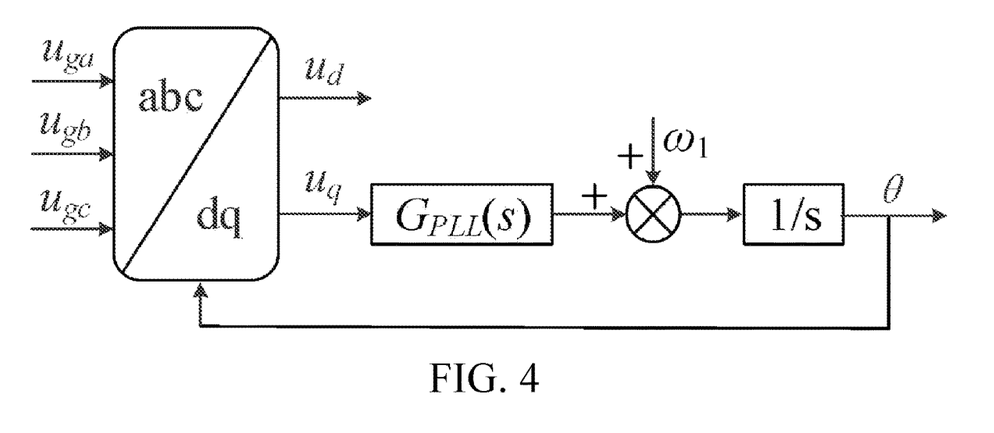
FIG. 4 is a block diagram of PLL control according to an embodiment of the present invention.
Figure 5:
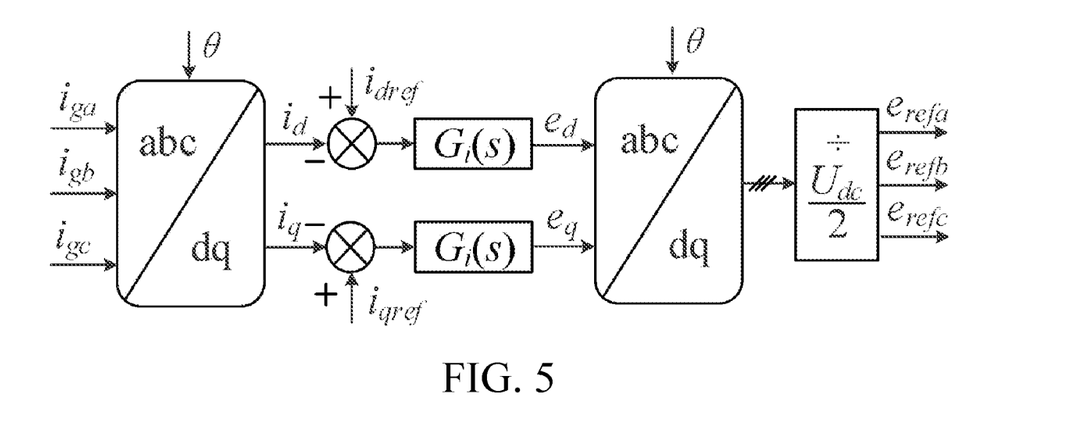
FIG. 5 is a block diagram of current closed-loop control according to an embodiment of the present invention.

As shown in FIG. 4, three-phase grid voltages $u_{ga}$, $u_{gb}$ and $u_{gc}$, are subjected to abc/dq transformation to obtain dq-axis voltages $u_d$ and $u_q$, the q-axis voltage $u_q$ is added with a power grid fundamental frequency angular frequency $\omega_l$ through a PLL controller, and a power grid phase-A phase angle $\theta$ is obtained through an integration link. As shown in FIG. 5, three-phase power grid currents $i_{ga}$, $i_{gb}$ and $i_{gc}$ are subjected to abc/dq transformation to obtain dq-axis currents $i_d$ and $i_q$, dq-axis current references $i_{dref}$ and $i_{qref}$ are subtracted from the dq-axis currents $i_d$ and $i_q$ to obtain dq-axis control signals $e_d$ and $e_q$ through a current controller, and $e_d$ and $e_q$ are subjected to dq/abc transformation and then divided by $U_{dc}/2$ to perform per-unit to obtain three-phase current control fundamental frequency modulation signals $e_{refa}$, $e_{refb}$, and $e_{refc}$.

Figure 6:
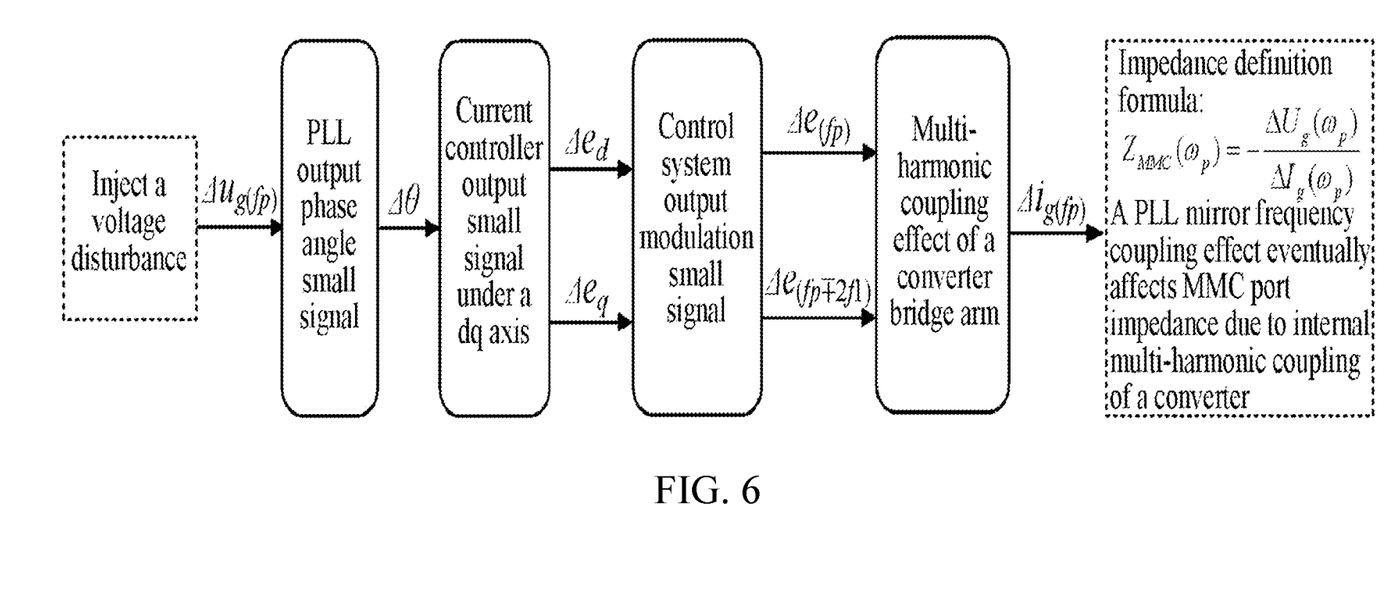
FIG. 6 is a block diagram of interactive coupling of a control link and a converter of an MMC grid-connected system according to an embodiment of the present invention.

As shown in FIG. 6, a method for modeling sequence impedance of an MMC under PLL coupling includes: establishing a relationship model between a frequency domain PLL phase angle small signal and a q-axis voltage small signal of a power grid; then establishing a dq-axis output control small signal model, and deducing an expression of a phase-a modulation small signal according to the dq-axis output control small signal model; and finally, substituting a system model into a harmonic state space matrix to calculate a current response when injecting a voltage disturbance, and calculating an MMC port impedance model according to an impedance definition.

The above method specifically includes the following steps:

S1. Establish a circuit topology model

A current-controlled MMC grid-connected system is divided into two parts: a circuit topology and a control link, and relevant parameters are acquired. A circuit topology model is established as follows:

$$\begin{cases} Ri_g + L\dfrac{di_g}{dt} + 2u_g = n_l u_{cl}^\Sigma - n_u u_{cu}^\Sigma \\ 2Ri_c + 2L\dfrac{di_c}{dt} + n_l u_{cl}^\Sigma + n_u u_{cu}^\Sigma = U_{dc} \\ C_{arm}\dfrac{du_{cu}^\Sigma}{dt} = n_u\left(i_c + \dfrac{i_g}{2}\right) \\ C_{arm}\dfrac{du_{cl}^\Sigma}{dt} = n_l\left(i_c - \dfrac{i_g}{2}\right) \end{cases} \quad (1)$$

In formula (1), R is parasitic resistance of an MMC bridge arm, L is filtering inductance of the MMC bridge arm, $C_{arm}$ is equivalent capacitance of a bridge arm, $u_{cu}^\Sigma$ is a sum of capacitance voltages of an upper bridge arm, $u_{cl}^\Sigma$ is a sum of capacitance voltages of a lower bridge arm, $n_u$ is a modulation signal of the upper bridge arm, $n_l$ is a modulation signal of the lower bridge arm, $i_c$ is the circulating current, $i_g$ is the ac-side current, $U_{dc}$ is a direct current voltage, and $u_g$ is an alternating current power grid voltage.

S2. Establish a PLL output characteristic model

According to an abc/dq transformation formula under a phase angle disturbance and a PLL control signal path, a relationship model between a PLL output phase angle small signal $\Delta\theta$ and a q-axis power grid voltage small signal of a power grid and a PLL controller $G_{PLL}$ is established as follows:

$$\Delta\theta = \dfrac{G_{PLL}(s \mp j\omega_1)}{s \mp j\omega_1 + u_d G_{PLL}(s \mp j\omega_1)} \Delta u_{qp/n0} = H_{PLL}(s \mp j\omega_1) \Delta u_{qp/n0} \quad (2)$$

In formula (2), $s \mp j\omega$ is a controller frequency offset when injecting positive and negative sequence disturbances, a subscript pin represents a variable when injecting the positive and negative sequence disturbances, $u_d$ is a d-axis steady-state operating point of a power grid voltage, $\omega_1$ is an angular frequency corresponding to a 50 Hz fundamental frequency of the power grid, and $\Delta u_{qp/n0}$ is a q-axis component obtained by performing Park transformation on a positive or negative sequence small disturbance voltage injected into the MMC alternating current side separately without considering the phase angle disturbance of the PLL.

$$\Delta u_{qp/n0} = \Delta U_g \cos(\omega_p \mp \omega_l)t \quad (3)$$

$\Delta U_g$ is an injected disturbance voltage amplitude, and $\omega_p$ is an injected disturbance angular frequency. A PLL transfer function is defined as $H_{PLL}$.

S3. Establish a PI controller output control small signal model under a dq axis

According to a current closed-loop control path, a relationship model between control small signals $\Delta e_d$ and $\Delta e_q$ under the dq axis and current small signals $\Delta i_d$ and $\Delta i_q$ under the dq axis, current steady-state operating points $i_d$ and $i_q$ under the dq axis, and the phase angle small signal $\Delta \omega$ and a current controller $G_i$, is established as follows:

$$\begin{cases} \Delta i_{dp/n} = \Delta i_{dp/n0} + i_q \Delta \theta \\ \Delta i_{qp/n} = \Delta i_{qp/n0} + i_d \Delta \theta \end{cases} \quad (4)$$

$$\begin{cases} \Delta e_{dp/n} = \Delta i_{dp/n} G_i(s \mp j\omega_1) \\ \Delta e_{qp/n} = -\Delta i_{qp/n} G_i(s \mp j\omega_1) \end{cases} \quad (5)$$

S4. Deduce a modulation small signal

According to the control small signals $\Delta e_d$ and $\Delta e_q$ and in consideration of a dq/abc transformation formula under a phase angle disturbance, modulation small signals of frequency $f_p$ output by a phase-a control system and frequency $f_p \mp 2f_1$ generated under the action of PLL coupling are obtained as follows:

$$\Delta e_{refp/n} = [\Delta e_{dp/n} \cos(\theta + \Delta\theta) - \Delta e_{qp/n} \sin(\theta + \Delta\theta)] 2/U_{dc} \quad (6)$$

In formula (6), $\Delta e_{refp/n}$ is a modulation wave small signal disturbance output by phase current closed-loop control after the positive or negative sequence small disturbance voltage is injected into the MMC alternating current side separately, $\theta$ is a power grid voltage phase, it is now defined that $\theta = \omega t$ and a power grid angular frequency $\omega = 100\pi$ rad/s, and modulation small signals of frequencies $f_p$ and $f_p \mp 2f_1$ contained in an output phase-a of a control system are obtained by substituting specific expressions of each variable into the above formula:

$$\Delta e_{refp/n} = \left\{ -\frac{1}{2}[u_q + i_q G_i(s \mp j\omega_1)]\left[\cos\left(\omega_p t - \frac{\pi}{2}\right) + \cos\left((\omega_p \mp 2\omega_1)t - \frac{\pi}{2}\right)\right] - \frac{1}{2}[u_d + i_d G_i(s \mp j\omega_1)][\cos(\omega_p \mp 2\omega_1)t - \cos\omega_p t] \right\} \quad (7)$$

$$2H_{PLL}(s \mp j\omega_1)\Delta U_g / U_{dc}$$

S5. Calculate MMC port impedance

A system model is substituted into a harmonic state space matrix, a current response $\Delta i_g$ when injecting a voltage disturbance $\Delta u_g$ is calculated, and MMC port impedance is finally calculated according to a port impedance definition:

$$Z_{MMC}(\omega_p) = -\frac{\Delta U_g(\omega_p)}{\Delta I_g(\omega_p)} \quad (8)$$

In formula (8), $\Delta U_g(\omega_p)$ is a complex vector form of a grid-connected voltage disturbance at $\omega_p$, and $\Delta I_g(\omega_p)$ is a complex vector form of a grid-connected current disturbance at $\omega_p$.

Figure 7:
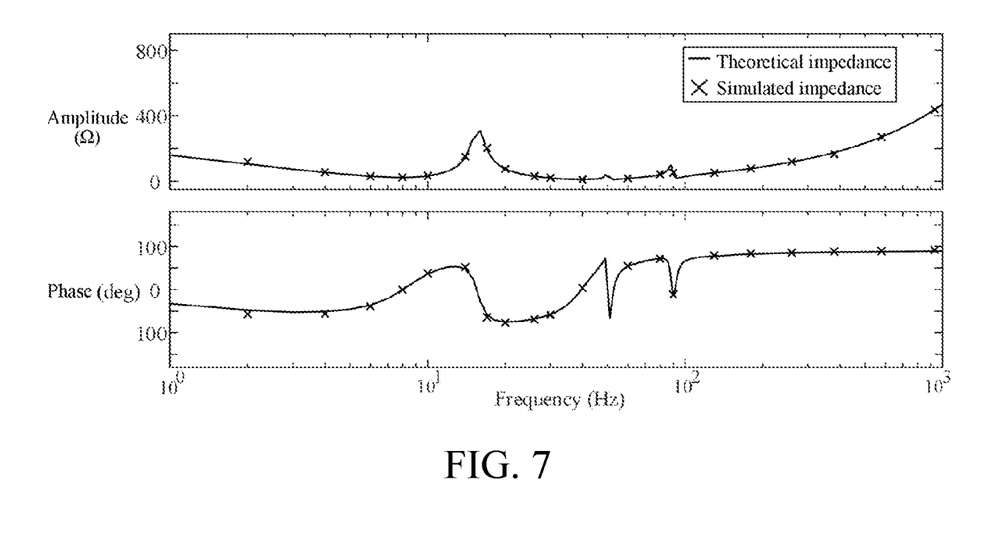
FIG. 7 is MMC positive sequence impedance under an ideal PLL according to an embodiment of the present invention.
Figure 8:
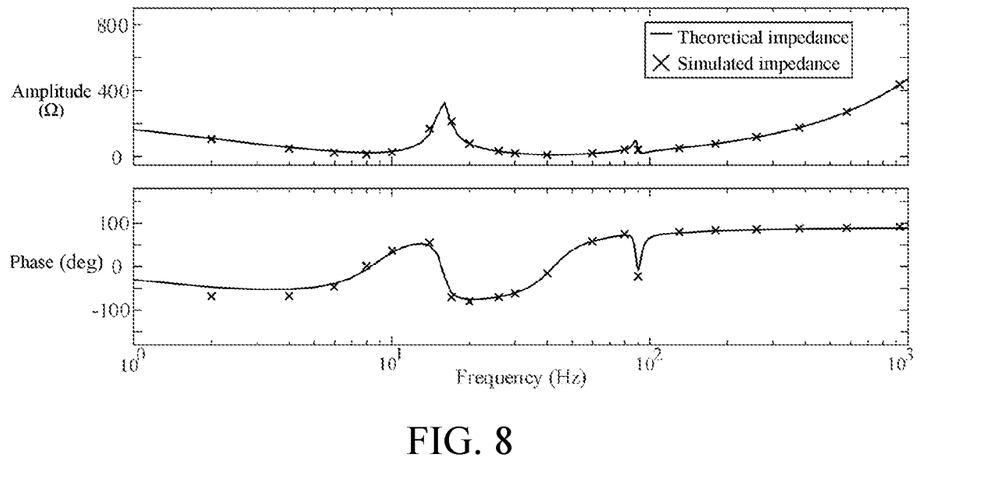
FIG. 8 is MMC negative sequence impedance under an ideal PLL according to an embodiment of the present invention.
Figure 9:
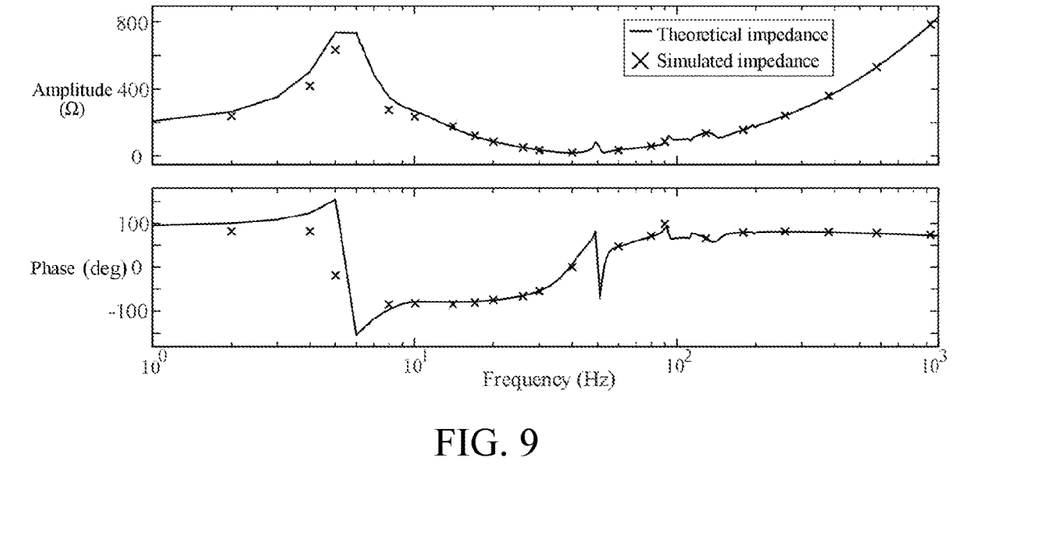
FIG. 9 is MMC positive sequence impedance in consideration of a PLL disturbance according to an embodiment of the present invention.
Figure 10:
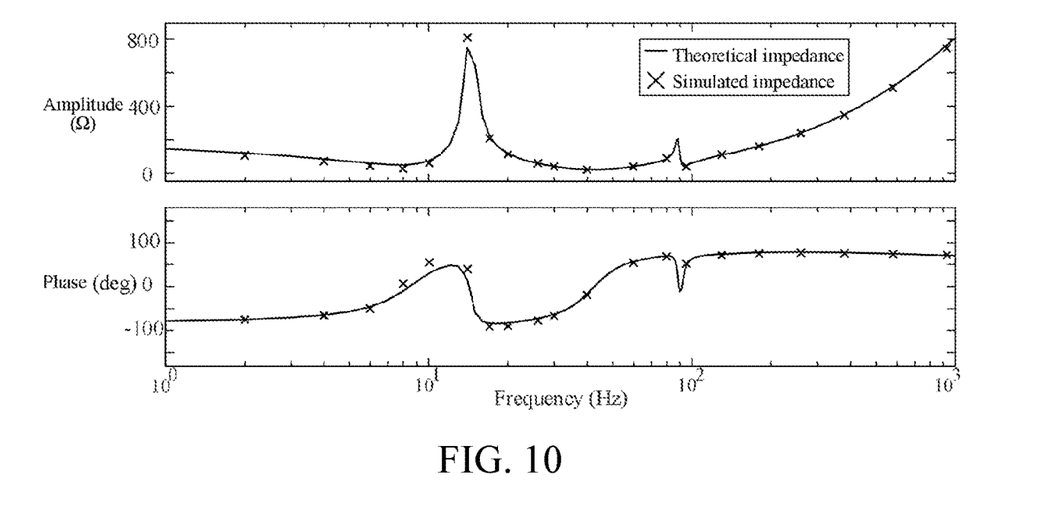
FIG. 10 is MMC positive sequence impedance in consideration of a PLL disturbance according to an embodiment of the present invention.

As shown in FIGS. 7 and 8, positive and negative sequence impedances of an MMC are basically consistent under an ideal PLL, and a three-phase system is in a symmetrical state. As shown in FIGS. 9 and 10, in consideration of an obvious difference between the positive and negative sequence impedances of the MMC under a PLL disturbance, it can be seen that the symmetry of the three-phase system is destroyed by introducing the PLL.

In conclusion, MMC theoretical impedance and simulated impedance curves match well, which verifies the correctness of impedance modeling. The present invention is particularly applicable to MMC grid-connected systems under current closed-loop control. Compared with existing methods, the proposed method not only establishes an accurate and effective PLL output characteristic model, but also establishes a high-precision MMC port impedance model.

In the descriptions of this specification, a description of a reference term such as "an embodiment", "an example", or "a specific example" means that a specific feature, structure, material, or characteristic that is described with reference to the embodiment or the example is included in at least one embodiment or example of the present invention. In this specification, exemplary descriptions of the foregoing terms do not necessarily refer to the same embodiment or example. In addition, the described specific features, structures, materials, or characteristics may be combined in a proper manner in any one or more of the embodiments or examples.

The foregoing displays and describes basic principles, main features of the present invention and advantages of the present invention. A person skilled in the art may understand that the present invention is not limited to the foregoing embodiments. Descriptions in the embodiments and this specification only illustrate the principles of the present invention. Various modifications and improvements are made in the present invention without departing from the spirit and the scope of the present invention, and these modifications and improvements shall fall within the protection scope of the present invention.

What is claimed is:

1. A method for modeling sequence impedance of a modular multilevel converter (MMC) under phase locked loop (PLL) coupling, comprising the following steps:

S1, establishing a circuit topology model dividing a current-controlled MMC grid-connected system into two parts: a circuit topology and a control link, and acquiring relevant parameters;

S2, establishing a PLL output characteristic model establishing a relationship model between a PLL output phase angle small signal $\Delta \theta$ and a q-axis power grid voltage small signal of a power grid and a PLL controller $G_{pll}$ according to an abc/dq transformation formula under a phase angle disturbance and a PLL control signal path;

S3, establishing a PI controller output control small signal model under a dq axis establishing a relationship model between control small signals $\Delta e_d$ and $\Delta e_q$ under the dq axis and current small signals $\Delta i_d$ and $\Delta i_q$ under the dq axis, current steady-state operating points $i_d$ and $i_q$ under the dq axis, and the phase angle small signal $\Delta \theta$ and a current controller $G_i$ according to a current closed-loop control path;

S4, deducing a modulation small signal obtaining modulation small signals of frequency $f_p$ output by a phase-a control system and frequency $f_p \mp 2f_1$ generated under the action of PLL coupling according to the control small signals $\Delta e_d$ and $\Delta e_q$ and in consideration of a dq/abc transformation formula under a phase angle disturbance;

S5, calculating MMC port impedance substituting a system model into a harmonic state space matrix, calculating a current response $\Delta i_g$ when injecting a voltage disturbance $\Delta u_g$, and finally calculating MMC port impedance according to a port impedance definition.

2. The method for modeling sequence impedance of the MMC under PLL coupling according to claim 1, wherein the establishing a circuit topology model in S1 is as follows:

$$\begin{cases} Ri_g + L\dfrac{di_g}{dt} + 2u_g = n_l u_{cl}^{\Sigma} - n_u u_{cu}^{\Sigma} \\ 2Ri_c + 2L\dfrac{di_c}{dt} + n_l u_{cl}^{\Sigma} + n_u u_{cu}^{\Sigma} = U_{dc} \\ C_{arm}\dfrac{du_{cu}^{\Sigma}}{dt} = n_u\left(i_c + \dfrac{i_g}{2}\right) \\ C_{arm}\dfrac{du_{cl}^{\Sigma}}{dt} = n_l\left(i_c - \dfrac{i_g}{2}\right) \end{cases} \quad (1)$$

in formula (1), R is parasitic resistance of an MMC bridge arm, L is filtering inductance of the MMC bridge arm, $C_{arm}$ is equivalent capacitance of a bridge arm, $u_{cu}^{\Sigma}$ is a sum of capacitance voltages of an upper bridge arm, $u_{cl}^{\Sigma}$ is a sum of capacitance voltages of a lower bridge arm, $n_u$ is a modulation signal of the upper bridge arm, $n_l$ is a modulation signal of the lower bridge arm, $i_c$ is the circulating current, $i_g$ is the ac-side current, $U_{dc}$ is a direct current voltage, and $u_g$ is an alternating current power grid voltage.

3. The method for modeling sequence impedance of the MMC under PLL coupling according to claim 1, wherein a relationship model of a PLL output phase angle small signal $\Delta\theta$ in S2 is as follows:

$$\Delta\theta = \frac{G_{PLL}(s \mp j\omega_1)}{s \mp j\omega_1 + u_d G_{PLL}(s \mp j\omega_1)} \Delta u_{qp/n0} = H_{PLL}(s \mp j\omega_1)\Delta u_{qp/n0} \quad (2)$$

in formula (2), $s \mp j\omega$ is a controller frequency offset when injecting positive and negative sequence disturbances, a subscript p/n represents a variable when injecting the positive and negative sequence disturbances, and $n_d$ is a d-axis steady-state operating point of a power grid voltage;

$$\Delta u_{qp/n0} = \Delta U_g \cos(\omega_p \mp \omega_l)t \quad (3)$$

$\Delta U_g$ is an injected disturbance voltage amplitude, $\omega_p$ is an injected disturbance angular frequency, and a PLL transfer function is defined as $H_{PLL}$.

4. The method for modeling sequence impedance of the MMC under PLL coupling according to claim 1, wherein a relationship model of a system output control small signal under a dq axis in S3 is as follows:

$$\begin{cases} \Delta i_{dp/n} = \Delta i_{dp/n0} + i_q \Delta\theta \\ \Delta i_{qp/n} = \Delta i_{qp/n0} + i_d \Delta\theta \end{cases} \quad (4)$$

$$\begin{cases} \Delta e_{dp/n} = \Delta i_{dp/n} G_i(s \mp j\omega_1) \\ \Delta e_{qp/n} = -\Delta i_{qp/n} G_i(s \mp j\omega_1) \end{cases} \quad (5)$$

5. The method for modeling sequence impedance of the MMC under PLL coupling according to claim 1, wherein a phase-a control system output modulation small signal in S4 is calculated as follows:

$$\Delta e_{ref/n} \Delta [\Delta e_{dp/n} \cos(\theta+\Delta\theta) - \Delta e_{qp/n} \sin(\theta+\Delta\theta)] 2/U_{dc} \quad (6)$$

in formula (6), θ is a power grid voltage phase, it is now defined that θ=ωt cot and a power grid angular frequency ω=100πrad/s, and modulation small signals of frequencies $f_p$ and $f_p \mp 2f_l$ contained in an output phase-a of a control system are obtained by substituting specific expressions of each variable into the above formula:

$$\Delta e_{ref/n} = \quad (7)$$
$$\left\{-\frac{1}{2}[u_q + i_q G_i(s \mp j\omega_1)]\left[\cos\left(\omega_p t - \frac{\pi}{2}\right) + \cos\left((\omega_p \mp 2\omega_1)t - \frac{\pi}{2}\right)\right] - \right.$$
$$\left.\frac{1}{2}[u_d + i_d G_i(s \mp j\omega_1)][\cos(\omega_p \mp 2\omega_1)t - \cos\omega_p t]\right\}$$
$$2H_{PLL}(s \mp j\omega_1)\Delta U_g/U_{dc}.$$

6. The method for modeling sequence impedance of the MMC under PLL coupling according to claim 1, wherein the impedance calculation formula in S5 is as follows:

$$Z_{MMC}(\omega_p) = -\frac{\Delta U_g(\omega_p)}{\Delta I_g(\omega_p)} \quad (8)$$

in formula (8), $\Delta U_g(\omega_p)$ is a complex vector form of a grid-connected voltage disturbance at $\omega_p$, and $\omega I_g(\omega_p)$ is a complex vector form of a grid-connected current disturbance at $\omega_p$.

* * * * *